United States Patent [19]

Engdahl

[11] 3,974,504

[45] Aug. 10, 1976

[54] PEAK ACCELEROGRAPH

[76] Inventor: Paul D. Engdahl, 2850 Monterey Ave., Costa Mesa, Calif. 92626

[22] Filed: June 27, 1975

[21] Appl. No.: 591,136

[52] U.S. Cl. .................................. 346/7; 73/515; 346/77 R; 346/139 R
[51] Int. Cl.² ............................................ G01D 15/02
[58] Field of Search ................. 346/7, 77 R, 139 R; 73/516, 515

[56] References Cited
UNITED STATES PATENTS

| | | | |
|---|---|---|---|
| 2,959,459 | 11/1960 | Ryan | 346/7 |
| 3,740,757 | 6/1973 | Engdahl | 346/7 |
| 3,795,006 | 2/1974 | Engdahl | 346/7 |

Primary Examiner—Joseph W. Hartary
Attorney, Agent, or Firm—Lawrence Fleming

[57] ABSTRACT

A three-axis instrument for recording peak accelerations in earthquakes and like kinds of shocks. Recording is by scratches made by hard styli on small metal record plates. No power source and no maintenance are required. The seismic recording elements have novel configurations of mass, spring, and lever arm which permit improved combinations of sensitivity and natural frequency for any given magnitude of stylus friction. For example, a sensitivity of 0.25 cm per g with a natural frequency of 32 Hz may be attained, where error due to a stylus frictional force of 70 mg is less than 1 percent of full-scale. Both hydraulic and magnetic dampers are employed. The latter also provide motional electrical signals for use in calibration.

9 Claims, 12 Drawing Figures

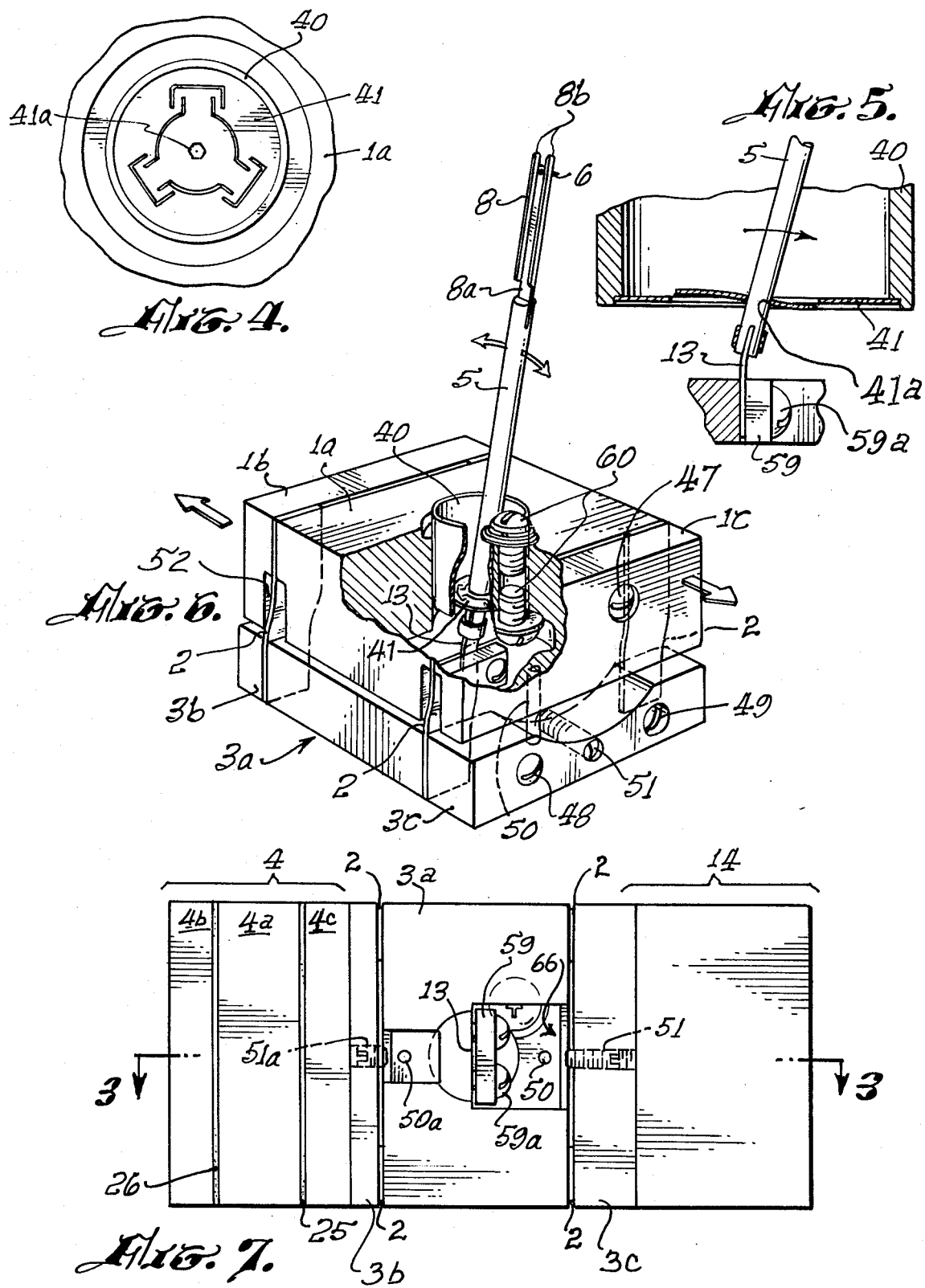

PEAK ACCELEROGRAPH

BACKGROUND

In nuclear power plants and other critical locations, instruments are installed which record potentially-damaging motion of the earth, as from earthquakes. A typical known such instrument is a three-axis strong-motion accelerograph, which records the acceleration components of the earth motion with, e.g., a constant sensitivity of the order of 1 g full-scale over a frequency range of 0–20 Hz. Such instruments record on moving film or tape and require electrical power.

To back up such devices, simpler instruments are also employed. These yield only the peak values of the accelerations but are entirely passive, requiring no power and no maintenance, so that they may stand by reliably for years without attention. Once such peak accelerograph comprises a set of damped seismic mass-spring systems mounted on mutually perpendicular axes, each adapted to displace a small permanent magnet across the surface of a small stationary slip of magnetic tape. After a seismic event has occurred, the tape slips may be removed, and the lengths of the "tracks" traversed by the small magnets determined. Such slips of magnetic tape are, however, subject to erroneous recording while being inserted or removed and to erasure by strong magnetic fields, and will not survive a fire.

SUMMARY

This invention is a peak acceleration recorder or accelerograph of the passive type, for installation in nuclear power plants or other critical locations. The instrument is of the type capable of standing by without any maintenance for long periods, requiring no electrical or other power, and having no moving parts except the seismic recording elements themselves. Its records are short linear "scratch" traces whose lengths are proportional to the peak values of acceleration experienced by the case of the instrument. A typical full-scale sensitivity is ± 1 g, constant over the frequency range 0–20 Hz.

The recording medium is a metal plate suitably coated with thin electroplated coatings of soft metals to provide a soft matte finish, easily scratched. Diamond styli record on the plates by leaving visible scratched lines. The records are unaffected by nuclear radiation, magnetic fields, and heat to 180°C.

A complete instrument has three recording assemblies disposed on mutually perpendicular axes, each with its individual replaceable record plate, and all mounted in a common case.

The seismic mass-spring sensing assemblies or systems employ novel concepts. It is common in prior practice to employ a cantilever-type resilient reed with a suitable mass attached to provide a suitable deflection in response to an applied acceleration (the mass moving in an arc), and also usual to provide a lever arm extending from the mass to a recording stylus to multiply this deflection to a suitable value. A lower limit is placed on the stiffness of the reed by the frictional force required for the stylus to make a visible scratch on the record plate. In practice, this force may be around 70 milligrams. In addition, the natural frequency of the system should be at least about 32 Hz. If, however, reasonable overall dimensions be chosen in this prior context, the mass required comes out impracticably large. The mass in such a prior "swinging" cantilever-reed system (shown for example in my prior U.S. Pat. No. 3,740,757) moves in rotation as well as translation, so that its moment of inertia affects the system's natural frequency; and it is found that the desired combination of characteristics cannot be attained. The present invention separates in a novel manner the functions of the seismic mass and spring from the pivoted lever arm which carries the stylus.

In this invention, the seismic mass is supported on parallel flexures which constrain it to move substantially linearly. A lever arm is separately pivoted on a short flexure and connected to the movable mass near this flexure or "pivot". The outer end of the lever arm carries a light cantilever spring support assembly terminating in a diamond stylus. This spring and stylus assembly may take a form generally like that shown in my prior U.S. Pat. No. 3,795,006 at 8, 9 in FIGS. 2 and 3 therein. An improved form is disclosed herein.

Each of the seismic spring-mass systems are damped to about the usual 60 percent of critical damping by a combination of hydraulic and magnetic dampers. Most of the damping is supplied by the hydraulic or fluid element. The remainder is supplied by a separate magnetic, moving-coil element. This latter element is adjustable by means of a shunt resistor. It also generates a motional electrical signal which is used in testing and calibration.

The connection between the seismic mass and the lever arm is preferably by means of a cantilever diaphragm mounted in an adjustable carrier.

Three complete seismic recording assemblies or systems are mounted in a common case on mutually perpendicular axes. All are preferably identical, except for the bias adjustment of the flexures (U.S. Pat. No. 3,740,757) necessary to balance the vertical system in the earth's gravitational field, and for the necessary means for distinction of the record plates. The plates, which are typically each about 2.5 cm square, have notches which engage pins in their respective plate supports. The notches and pins are located differently for the three kinds of plates so that a plate marked L will only fit the support associated with the L (Longitudinal) seismic system, and so on with the T (Transverse) and V (Vertical) plates. The plates are inserted and removed through covered openings in the instrument case. In a typical instrument, the scratch records are about 0.5 cm long (± 0.25 cm) in response to an applied full-scale acceleration of ± 1 g. They are visible to the naked eye, but are preferably measured under a low-power microscope.

The scratch records of the present instrument are immune to magnetic fields and to heat below the melting point of the metallic coating. Since the traces are narrow, of the order of 0.01 mm wide, it is possible by inspection to distinguish normal stylus records from accidental scratches.

DETAILED DESCRIPTION

In the drawing

FIG. 4 is an enlarged top view of a cantilever diaphragm which links the lever arm;

FIG. 5 is a side sectional view of the same diaphragm with connecting parts;

FIG. 6 is a partially-cutaway perspective view of a seismic platform mass, suspension, and lever arm according to the invention;

FIG. 7 is a bottom view of a complete one-axis seismic recording system according to the invention;

Figure 1:
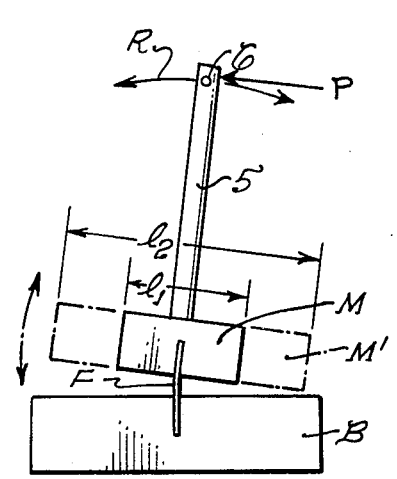
FIG. 1 is a diagram of a prior art seismic system.

Referring first to FIG. 1, a prior art mass-spring-stylus system is shown diagrammatically. A seismic mass M is connected pivotally and resiliently to a base B by means of a short cantilever spring or flexure F. A lever arm 5 is attached to mass M and terminates in a recording stylus or other marking element 6. The problem is to provide a large enough stiffness as seen at the stylus 6 to adequately overcome the frictional force P presented to the stylus 6 by the recording medium (not shown), in order to minimize hysteresis-type frictional errors. In the present scratch-type recording method, a typical force of coulomb friction at the stylus is about 70 milligrams. Assume now that the force available from the restoring spring or flexure F at full-scale deflection is 100 times as much or 7 grams, this in order to make the frictional error no more than 1 percent of full-scale. Taking now a convenient multiplying lever factor of 10, the corresponding full-scale restoring force at the center of mass of seismic mass M must be 70 grams. Taking the applied full-scale acceleration as 1 g, the mass M itself must weigh 70 grams.

I have found that, assuming reasonable overall dimensions for a small system, it is barely possible to have room for the mass M. If it be enlarged outward toward the stylus 6, its center of mass moves outward also, and the effective lever arm ratio—hence the sensitivity—decreases. If it be enlarged sideways, as shown by the dotted lines M', its moment of inertia about the axis of rotation at F will increase rapidly. Since the mass is displaced in rotation (moving in an arc) as well as in translation, the natural frequency of the system M, F will be very substantially lower than if the mass moves solely in translation.

Accordingly, it is advantageous to abandon this prior arrangement and provide the mass with constraints which permit it to move substantially only in translation, and to provide separate means for the linking and constraint of the lever arm. Such a configuration will also provide novel advantages in the feasible kind and placement of damping devices.

Figure 2:
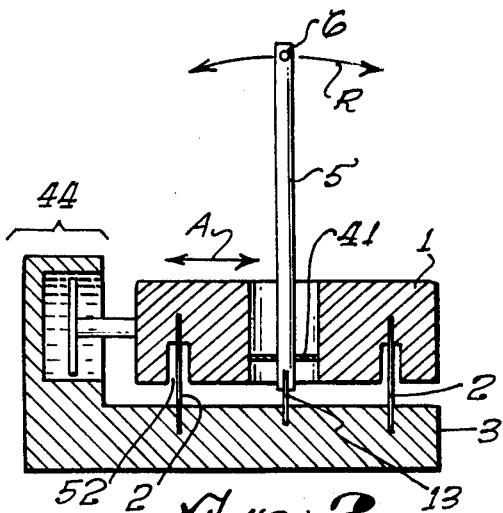
FIG. 2 is a diagram of a damped platform-type one-axis seismic system according to the invention.

Referring now to the simplified diagrammatic showing of FIG. 2, a seismic recording assembly according to the invention comprises a suitable base 3, a linearly displaceable seismic mass or platform 1, a pivoted recording arm 5, and a suitable damping element indicated generally at 44. Acceleration of the base 3 in the direction of arrow A will tend to leave the seismic mass 1 behind. The mass 1 is suspended on parallel flexures (flat springs) 2, 2, and so will become displaced with respect to the base 3 in a direction parallel thereto. The recording arm or lever arm 5 is connected to the mass 1 by suitable means, such as a flexible diaphragm 41, and is pivotally connected to the base 3 as by a suitable short cantilever flexure element or spring 13. Thus, linear displacement of the platform mass 1 in direction A will swing the lever arm 5. A recording stylus 6 at the end portion of arm 5 will describe an arc R, whose amplitude is several times greater than the linear displacement of the mass 1. The functions of suspending the seismic mass 1 and of pivoting the lever arm 5 have been separated.

The damping factor may be chosen as 60 percent of critical, as is common practice in accelerometer design. A typical natural frequency in the present context is 32 Hz.

Figure 3:
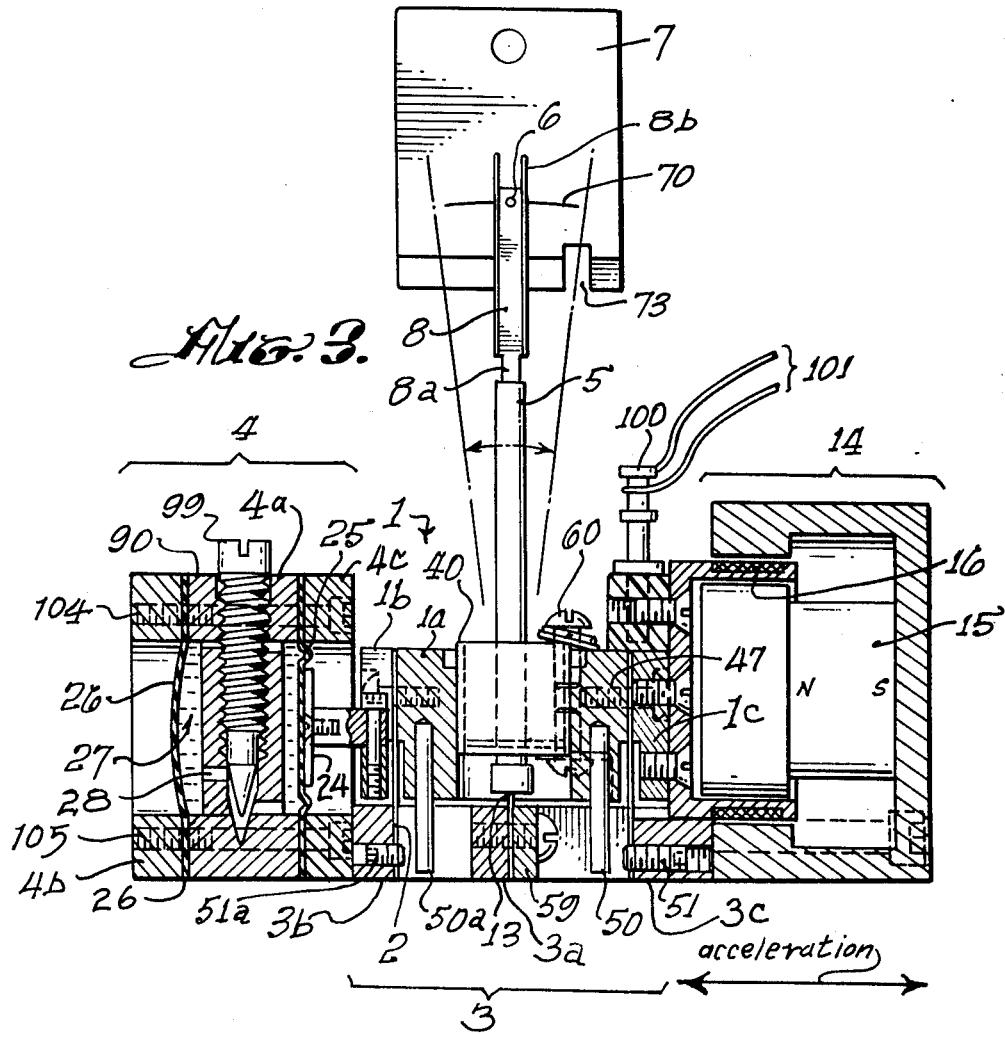
FIG. 3 is a sectional side view of a complete one-axis seismic recording system according to the invention, being a section on line 3—3 of FIG. 7.

FIG. 3 shows a side cross-sectional view of one channel of a complete seismic recording system according to the invention. As in FIG. 2, the seismic mass 1 is suspended on parallel flexures 2, 2 which are attached to the base 3. Two separate damping elements are provided, one magnetic and one hydraulic, because it is impracticable to obtain a large enough damping factor with magnetic damping alone in a system having mass, stiffness, and natural frequency of the orders given above. The hydraulic damping element is indicated generally at 4. Rigidly connected to the seismic mass 1 is a disc 24 in the center of a thin flexible elastomeric diaphragm 25, which may be of silicone rubber. A fluid filling 27, as of silicone oil, is confined between this diaphragm 25 and a soft elastomeric closure disc 26. Between the two is a relatively small orifice 28. When the seismic mass 1 moves, it pumps the liquid 27 back and forth through the orifice, and its motion is thereby viscously damped. The effective size of the orifice 28 is adjustable by means of a screw 99, in known manner. The hydraulic damper is made in three main pieces 4a, 4b, 4c clamped together by screws as at 104, 105, FIGS. 7 and 3.

In FIG. 3, the magnetic damper 14 has a moving coil 16 which is attached to the right-hand end of the seismic mass 1. The coil form may be of copper. It is movable in an annular gap in a magnetic circuit comprising a magnet 15, similarly to a conventional loudspeaker. The coil leads preferably extend to a pair of terminals 100 (only one is visible) across which a resistor may be connected. The value of the resistor is chosen to give the desired damping factor, in the manner of a fine trimming adjustment.

This magnetic damper 14 serves also as a generator of an electrical signal voltage proportional to the velocity of motion of the seismic mass 1. This signal may be integrated electrically by known means to provide a signal proportional to the displacement of mass 1 and, hence, of the stylus 6. This signal is used in the adjustment and calibration of the instrument. Leads 101 may be connected, for such purposes, from the terminals 100 to suitable external instruments.

In FIG. 3, the four parallel flexure strips 2, 2 . . . are located adjacent the corner portions of the mass 1. The mass 1 is divided into three portions 1a, 1b, 1c, between which the ends of the strips 2 are clamped by means of suitable screws such as 47. The base 3 is similarly divided into sections 3a, 3b, 3c, between which the strips are similarly clamped.

Stops to limit the linear travel of mass 1 may take the form of dowel pins 50, 50a which extend downward from the mass portion 1a into suitable cutout spaces in the base 3, and engage the ends of stop screws 51, 51a at the limits of displacement. See FIG. 7.

The lever arm 5 is pivoted (in effect) to the base 3 by the short flexure 13, FIGS. 2, 3, 5, 6. Its connection to the mass 1 is via a small thin diaphragm 41, FIGS. 2–6, which in turn is secured as by an adhesive into the end of a collar 40. Refer now to FIGS. 3 and 6. The collar 40 in turn fits slidably and rotatably into a bore in the mass portion 1a. After adjusting its position, it is secured in place by two screws 60. The diaphragm 41 (see FIGS. 4–5) is preferably of a particular type known as a cantilever diaphragm. The hole in its center portion is preferably polygonal, such as hexagonal, and located slightly off-center. The hole is slightly smaller than the diameter of the lever arm or rod 5, to provide an interference fit. Diaphragm 41 is preferably made from thin sheet spring metal by chemical etching.

Referring back to the flexure 13 at the root portion of lever arm 5, it will be seen that the base end of flexure 13 is secured to the base 3 by a clamping bar 59, which clamps it to a portion of the wall of a cutout 66. This is shown partly in FIGS. 3 and 5, and better in the bottom view of FIG. 7.

In FIG. 7, the clamping bar is shown held in place by the two screws 59a. The stop pins 50, 50a and the stop pin screws 51, 51a are also shown best in FIG. 7.

FIG. 4 is a top view of diaphragm 41. The arcuate and radial lines are cuts, preferably made by chemical etching.

Referring to FIG. 5, which is a sectional view of arm 5 and diaphragm 41 in deflected position, the central portions of the diaphragm deflect in cantilever fashion as shown. This type of diaphragm is particularly suited to permit rocking displacement of its central portion while preventing translation.

The adjustments of the eccentric diaphragm and collar are made as follows. Since the center hole 41a is positioned slightly off the true center of the diaphragm by an amount δ, conveniently about 0.007 inch or 0.18 mm, the diaphragm is eccentric. The purpose of this eccentricity is to permit lateral adjustment of the rest position of the arm 5 by rotating the collar 40 in its bore. After adjustment, the arm may be further secured with a small drop of adhesive. During adjustment also, the position of the diaphragm 41 along the length of arm 5, and hence the lever multiplying factor, may be varied by moving the eccentric collar 40 up or down in its bore. It is finally secured in place by tightening the two screws 60, FIGS. 3 and 6.

Figure 9:
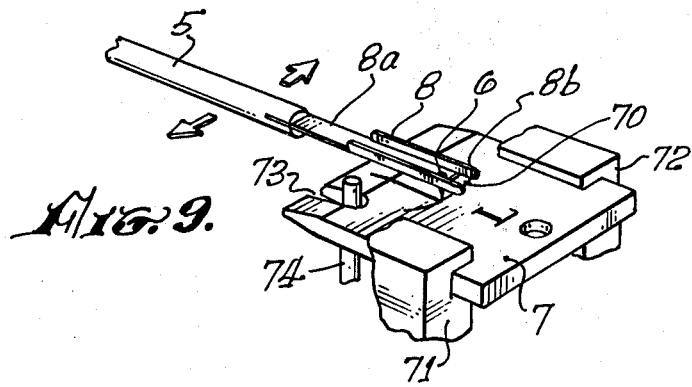
FIG. 9 is a perspective view of a recording stylus assembly and record plate.

FIG. 9 shows the outer portion of the arm 5, the stylus carrier 8 and stylus 6, a record plate 7, and portions of a record plate support 71, 72. The stylus carrier is preferably made of thin sheet spring stock of the order of 0.04 mm thick, bent as shown. The short unflanged flexure portion 8a provides the spring compliance which controls the stylus force against the record plate 7. The stylus is preferably of diamond with a conical tip of very small radius. Ears 8b extend ahead of the stylus; when a record plate 7 is inserted, the front edge of the plate 7 engages these ears and lifts up the stylus carrier, protecting the stylus from damage. When the plate is fully inserted, the stylus then bears on the plate surface, in position to scratch a record track as at 70.

The record plate support comprises two channel-like members as indicated at 71, 72, FIG. 9. The plate is inserted from the right. A complete instrument has three seismic recording assemblies or systems mounted on mutually perpendicular axes, with their respective record plates labeled, e.g., L, T, and V, for Longitudinal, Transverse, and Vertical. To insure that, for example, the L plates will fit only into the record support of the L, or lateral, assembly, the plates are notched as at 73, FIG. 9. The notches fit over pins as at 74. The notches are located differently for the different kinds of plates.

Figure 8:
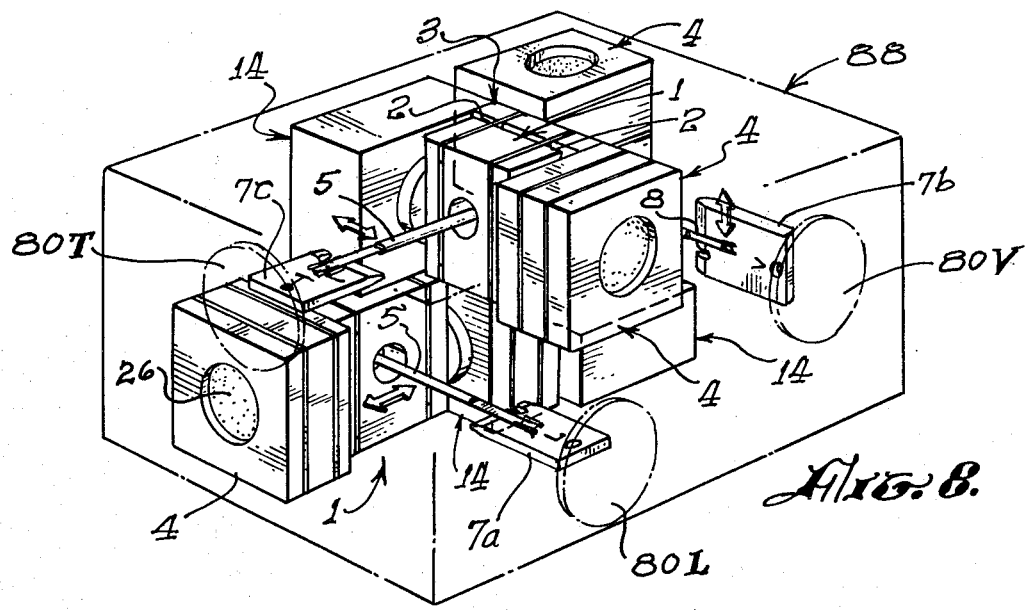
FIG. 8 is a diagrammatic perspective view of an assembly of three one-axis seismic systems to form a complete three-axis instrument.

A suitable disposition of three seismic recording assemblies into a single case 88 to form a triaxial instrument is shown diagrammatically in FIG. 8. The three assemblies may be fitted compactly together, as shown, with the recording styli extending to convenient locations opposite the side and end walls of the case. Mounting means for the record plates are omitted in FIG. 8 for clarity of illustration. Opposite each plate in the case wall there is provided a hole for insertion and removal of the plate, as shown at 80L, 80T, and 80V. These holes may be internally threaded and provided with round covers that screw in. The holes are preferably made just large enough to permit an operator to grasp the rear edge of a record plate and withdraw it, but not large enough to permit the fingers to enter far enough in to touch the stylus, thus preventing damage to the delicate stylus carriers and styli.

Figures 10, 11, 12:
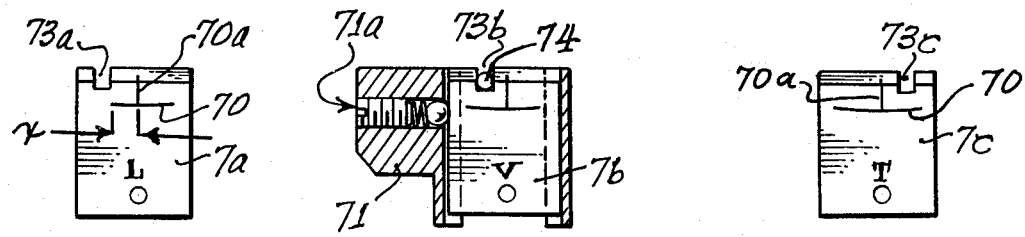
FIGS. 10, 11 and 12 are top views of three different types of record plates.

FIGS. 10, 11 and 12 show further details of the record plates. In FIG. 10, a V plate is notched at 73b, the notch engaging a pin. A portion of a support channel is also shown in FIG. 10. It is provided with a tapped hole 71a containing a spring and a pin or ball, which engages the side of the plate to restrain it against lateral displacement.

FIG. 11 shows a lateral or L plate 7a, with notch 73a located differently along its leading edge, so that, for example, it could not be inserted all the way into a V or T support. FIG. 12 shows a T plate 7c with notch 73C.

In FIGS. 9–12, a record trace or scratch 70 is shown. Entry and exit lines or scratches are also made when a plate is inserted or removed. These constitute the zero lines. One of these is shown best at 70a in FIG. 11. In reading the records, the operator also notes whether the entry and exit lines coincide, to increase the certainty of a correct record. If they do, it proves that no permanent deformation of the recording system occurred, as might occur if the instrument were accidentally dropped. The peak acceleration recorded on the plate is proportional to the amplitude $x$ of the scratch trace 70, measured from a zero line as at 70a.

Referring back to FIGS. 2, 3 and 6, it will be noted that the bottom portion of the seismic platform mass 1 has recesses 52 around the upper portions of the flexures 2. These recesses, shown best in FIGS. 2 and 6, permit a wide range of choice in the length of the flexures 2 without changing the overall dimensions of the system. They also move the effective plane of suspension of the mass 1 closer to its own center of mass, which improves the suppression of spurious modes of oscillation, such as torsional and lateral modes. In addition, as seen best in FIGS. 6 and 7, the substantially square shape of mass 1 and the location of the flexures 2 adjacent its corners both assist in the suppression of such spurious modes.

I claim:

1. A peak accelerograph assembly comprising:
   a base;
   a seismic mass and a set of parallel flexures connecting it resiliently to said base to constrain it substantially to oscillatory motion only in translation;
   a lever arm pivoted to said base and having a swingable connection to said mass and carrying a marking element adjacent its outer end; and
   a record plate in marking relation with said element, a known linear displacement of said mass acting to swing said arm to produce an arcuate mark on said plate of length greater than said displacement.

2. A peak accelerograph as in claim 1, further comprising damping means connected between said base and said mass.

3. A peak accelerograph as in claim 2, wherein said damping means comprises a hydraulic damper and an electromagnetic moving-coil damper, connected respectively to opposite ends of said mass.

4. An instrument as in claim 2, wherein:
said damping means comprises a hydraulic damper having a central body portion and two body end portions and elastomeric diaphragms clamped to opposite sides of said central portion by said end portions,
a fluid filling between said diaphragms,
orifice-like passages disposed to permit flow of said fluid between said diaphragms,
an adjusting screw having a tapered portion and disposed to adjustably control the effective size of at least one of said passages,
and a rigid connection between one of said diaphragms and said seismic mass.

5. An instrument as in claim 2, wherein:
said marking element comprises a hard stylus on a stylus carrier,
said stylus carrier being made of thin resilient material and having a flat spring portion, a channel-like portion, and protective ear portions,
said ear portions being disposed to flex said spring portion to raise said stylus out of engagement with said record plate when said plate is being inserted, to protect said stylus.

6. An instrument as in claim 5, wherein:
said plate has a tapered entering wedge portion to engage said ears, and a flat surface portion upon which said stylus is disposed to rest after said plate is fully entered.

7. An instrument as in claim 6 wherein:
three of said assemblies are mounted in a common case and oriented to record accelerations on three mutually perpendicular axes,
said case having coverable openings for each of three separate record plates,
said openings being too small to permit entry of an operator's fingers to touch said stylus carrier, and
each of said plates having notches adapted to engage pins in their respective assemblies, said notches and pins being differently located for each of the three assemblies,
whereby a plate marked for a given orientation can only be inserted in an assembly of that orientation.

8. An instrument as in claim 1 wherein:
said swingable connection comprises an eccentric collar and diaphragm member seated in a bore in the central portion of said mass and adjustable along the axis of said bore and also in rotation,
said clamp screws to secure said collar in a chosen position,
said position being adjusted in rotation to center said marking element on said plate, and along said axis to adjust the multiplication ratio of said arm.

9. An instrument as in claim 8 wherein said diaphragm is a cantilever diaphragm adapted to offer compliance to rocking displacement of its center portion in rotation about axes parallel to its own plane.

* * * * *